(12) United States Patent
Cheung et al.

(10) Patent No.: US 12,353,255 B2
(45) Date of Patent: Jul. 8, 2025

(54) EASY-DISASSEMBLE SMART WEARABLES AND CONNECTING ASSEMBLY THEREOF

(71) Applicant: SOLOS TECHNOLOGY (SHENZHEN) LIMITED, Guangdong (CN)

(72) Inventors: Wai Kuen Cheung, Guangdong (CN); Chiu Ming So, Guangdong (CN); Chiu Kan Tsang, Guangdong (CN); Kwok Wah Law, Guangdong (CN)

(73) Assignee: Solos Technology (Shenzhen) Limited, Shenzhen (CN)

( * ) Notice: Subject to any disclaimer, the term of this patent is extended or adjusted under 35 U.S.C. 154(b) by 276 days.

(21) Appl. No.: 18/053,751

(22) Filed: Nov. 8, 2022

(65) Prior Publication Data

US 2023/0266802 A1 Aug. 24, 2023

(30) Foreign Application Priority Data

Feb. 18, 2022 (CN) .......................... 202210152566.0

(51) Int. Cl.
*G06F 1/16* (2006.01)

(52) U.S. Cl.
CPC ............ *G06F 1/1681* (2013.01); *G06F 1/163* (2013.01); *G06F 1/1656* (2013.01)

(58) Field of Classification Search
CPC ...... G06F 1/1681; G06F 1/163; G06F 1/1656; G06F 1/1683
See application file for complete search history.

(56) References Cited

U.S. PATENT DOCUMENTS

| | | | | |
|---|---|---|---|---|
| 7,581,833 B2 * | 9/2009 | Howell | ................ | G02C 11/10 351/158 |
| 8,465,151 B2 * | 6/2013 | Howell | ................ | G02C 5/143 351/158 |
| 9,442,305 B2 * | 9/2016 | Blum | .................... | G02C 7/081 |
| 9,470,909 B2 * | 10/2016 | Willey | ................... | G02C 11/10 |
| 9,690,121 B2 * | 6/2017 | Howell | ................. | H02J 7/0045 |
| 9,874,936 B2 * | 1/2018 | Cox | ...................... | G06F 3/012 |
| 9,927,877 B2 * | 3/2018 | Cox | ...................... | G06F 3/0488 |
| 10,168,551 B2 * | 1/2019 | Blum | ................... | H01R 33/955 |
| 10,222,633 B2 * | 3/2019 | Blum | ................... | G02C 11/10 |
| 10,423,011 B2 * | 9/2019 | Blum | .................... | G02C 7/083 |
| 11,249,327 B2 * | 2/2022 | Kamibeppu | ............ | G02C 1/10 |
| 11,733,549 B2 * | 8/2023 | Howell | ................. | H02J 7/0045 351/158 |
| 11,886,048 B2 * | 1/2024 | Kamibeppu | ............ | G02C 1/10 |

(Continued)

*Primary Examiner* — Anthony M Haughton
*Assistant Examiner* — Theron S Milliser

(57) ABSTRACT

The present application provides an easy-disassemble smart wearables and a connecting assembly thereof. The easy-disassemble smart wearables includes a first component, a second component, a third component and the connecting assembly. The connecting assembly includes a connecting wire, a first smart hinge and a second smart hinge. The connecting wire is embedded in the first component. A first end of the first smart hinge is hinged with a first end of the first component, and a second end of the first smart hinge is connected to the second component by plugging. A first end of the second smart hinge is hinged with a second end of the first component, and a second end of the second smart hinge is connected to the third component by plugging.

18 Claims, 11 Drawing Sheets

(56) References Cited

U.S. PATENT DOCUMENTS

| | | | | |
|---|---|---|---|---|
| 2007/0046887 A1* | 3/2007 | Howell | ............... | G02C 5/146 |
| | | | | 351/41 |
| 2010/0309426 A1* | 12/2010 | Howell | ............... | G02C 5/146 |
| | | | | 351/158 |
| 2013/0070198 A1* | 3/2013 | Willey | ............... | G02C 7/101 |
| | | | | 351/158 |
| 2013/0201440 A1* | 8/2013 | Howell | ............... | G02C 5/143 |
| | | | | 351/158 |
| 2013/0342457 A1* | 12/2013 | Cox | ............... | H05K 7/14 |
| | | | | 345/158 |
| 2013/0342981 A1* | 12/2013 | Cox | ............... | G06F 3/042 |
| | | | | 361/679.01 |
| 2014/0028966 A1* | 1/2014 | Blum | ............... | G02C 5/143 |
| | | | | 351/153 |
| 2015/0248026 A1* | 9/2015 | Willey | ............... | H01R 35/04 |
| | | | | 351/158 |
| 2017/0031181 A1* | 2/2017 | Blum | ............... | G02C 7/101 |
| 2017/0075141 A1* | 3/2017 | Blum | ............... | G02C 7/081 |
| 2017/0108713 A1* | 4/2017 | Blum | ............... | H01R 33/945 |
| 2017/0131575 A1* | 5/2017 | Howell | ............... | G02C 11/10 |
| 2017/0146829 A1* | 5/2017 | Howell | ............... | G02C 5/146 |
| 2019/0324294 A1* | 10/2019 | Kamibeppu | ............... | G02C 1/10 |
| 2022/0137434 A1* | 5/2022 | Kamibeppu | ............... | G02C 1/10 |
| | | | | 351/159.39 |
| 2023/0266802 A1* | 8/2023 | Cheung | ............... | G06F 1/1656 |
| | | | | 361/679.02 |

* cited by examiner

EASY-DISASSEMBLE SMART WEARABLES AND CONNECTING ASSEMBLY THEREOF

CROSS-REFERENCE TO RELATED APPLICATIONS

This application claims priority to Chinese Patent Application No. 202210152566.0, filed on Feb. 18, 2022, the entire contents of which are hereby incorporated by reference.

TECHNICAL FIELD

The present application relates to the technical field of smart wearables, and in particular to an easy-disassemble smart wearables and a connecting assembly thereof.

BACKGROUND

With the development of wearable technology, intelligent wearables, such as intelligent glasses, are used more widely. However, some questions need to be improved are also exposed during in use.

For existing smart wearables (such as smart glasses), the frame is assembled with the legs which are designed originally through the connecting assembly (smart hinge) after the glasses accessories are produced. Because the legs are provided with connectors in different types, the ports thereof for connecting the hinges are also different. Therefore, the smart hinge can only install a connector that matches the connector of the leg, which leads to a kind of frame can only correspond to a kind of leg, limiting the flexible switching of product functions.

In addition, the existing smart wearables are difficult to disassemble after being assembled, and if functional parts thereof need to be repaired or replaced, it is not easy to disassemble, thereby taking a long time to repair or replace the functional parts.

Thus, it is necessary to provide a smart wearables which is easy to disassemble functional parts thereof.

SUMMARY

The present application provides an easy-disassemble smart wearables and a connecting assembly thereof, which aims to solve the problem in the art that functional parts of the smart wearables are not easy to disassemble.

The present application is realized as follows: a connecting assembly, configured for connecting three components of an easy-disassemble smart wearables, including a connecting wire, a first smart hinge and a second smart hinge,
  a first end of the first smart hinge being adapted to hinge with the first component, and a second end of the first smart hinge being connected the second component by plugging;
  a first end of the second smart hinge being adapted to hinge with the first component, and a second end of the second smart hinge being connected to the third component by plugging;
  the second end of the first smart hinge being provided with a first connector, and the type of the first connector matching that of a connector on the second component;
  the second end of the second smart hinge being provided with a second connector, and the type of the second connector matching that of a connector on the third component; and
  the first smart hinge being electrically connected to the second smart hinge through the connecting wire.

In some embodiment, the first smart hinge or the second smart hinge further includes an insulating shell and a circuit board, the first connector or the second connector is mounted at a second end of the insulating shell, the circuit board is mounted in the insulating shell, the first connector or the second connector is electrically connected to the circuit board, a first end of the insulating shell is adapted to hinge with the first component, the second end of the insulating shell is adapted to connect the second component or the third component by plugging, and the second end of the insulating shell is provided with a latching portion for connecting the second component or the third component by snap-fit.

In some embodiment, the first smart hinge or the second smart hinge further includes a substrate, an end of the connecting wire is welded to the substrate, and the first smart hinge or the second smart hinge is welded to the substrate.

In some embodiment, a connecting hole is defined in the first end of the insulating shell, and the first end of the insulating shell is hinged with the first component by a shaft mounted in the connecting hole.

In some embodiment, the first connector or the second connector is welded to the circuit board, and the first connector or the second connector is a USB Type-B connector, a USB Type-C connector or an apple lightning connector.

In some embodiment, the insulating shell defines a chamber, the latching portion is an internal latching element which is formed at an inner wall of the chamber and protrudes outwardly from the inner wall of the chamber into the chamber.

To solve the above technical problem, the present application further provides an easy-disassemble smart wearables, including a first component, a second component, a third component and a connecting assembly, the connecting assembly including a connecting wire, a first smart hinge and a second smart hinge, the first smart hinge being electrically connected to the second smart hinge through the connecting wire;
  the connecting wire of the connecting assembly being embedded in the first component;
  a first end of the first smart hinge being hinged with a left end of the first component, and a second end of the first smart hinge being connected to the second component by plugging, the second end of the first smart hinge being provided with a first connector; and
  a first end of the second smart hinge being hinged with a right end of the first component, and a second end of the second smart hinge being connected to the third component by plugging, the second end of the second smart hinge being provided with a second connector.

In some embodiment, an open slot is defined in the first component and extends through the left and right ends of the first component, the connecting wire is embedded in the open slot, and an open end of the open slot is covered with a sealing cover.

In some embodiment, the easy-disassemble smart wearables is a pair of smart glasses, the first component is a frame of smart glasses, the second component is a left leg of smart glasses, and the third component is a right leg of smart glasses;
  a connecting end of the left leg is provided with a connector matching the first connector, and a connecting end of the right leg is provided with a connector matching the second connector;

the first ends of the first smart hinge and the second smart hinge are respectively hinged with the left and right ends of the frame through a mounting shaft, the second end of the first smart hinge is fixed to the connecting end of the left leg by a snap structure, and the second end of the second smart hinge is fixed to the connecting end of the right leg by a snap structure.

In some embodiment, an outer surface of the connecting end of the left/right leg is enclosed by a sealing ring, and a front end face of the second end of the first/second smart hinge abuts against the sealing ring after the first/second smart hinge is connected to the left/right leg by plugging.

In some embodiment, both sides of the outer surface of the connecting end of the left/right leg are provided with an anticollision groove near the sealing ring, and the sealing ring is pressed to deform and engages into the anticollision grooves after the first/second smart hinge is connected to the left/right leg by plugging.

In some embodiment, the connector at the connecting end of the left leg or the right leg is a USB Type-B connector, a USB Type-C connector or an apple lightning connector.

In some embodiment, the connecting wire is an electric cable which is embedded in the frame, the first connector at the left end of the frame and the second connector at the right end of the frame are connected together by the electric cable.

In some embodiment, the left leg and/or the right leg are provided with a rechargeable battery that is electrically connected to the connector at its connecting end; when the rechargeable battery needs to be charged, the left leg and/or the right leg can be disassembled from the connecting assembly and then the connector of the left leg and/or the right leg can be connected to a corresponding type of external charging cable, thereby realizing charging the rechargeable battery.

Compared with the prior art, the present application has the following advantages:

The connecting assembly of the present application includes two smart hinges, and the two smart hinges are electrically connected by a connecting wire. First ends of the two smart hinges are respectively hinged with two ends of the first component, and second ends of the two smart hinges are respectively hinged with the second component and the third component by plugging. Since the connection by plugging is detachable, it can realize detachable connection among three components of a smart wearables to which the connecting assembly is applied. The components are easy to disassemble, which is conducive to improving the production yield and reducing the maintenance time of the smart wearables. Further, the components of different generations or styles can be interchanged, the user can upgrade their smart wearables with the latest components, and thus product functions can be switched flexibly.

BRIEF DESCRIPTION OF THE DRAWINGS

In order to illustrate technical solutions of embodiments of the present application more clearly, drawings that need to be used in the description of the embodiments will be briefly described below. It is obvious that the drawings described below are only some embodiments of the present application, and other drawings may be obtained from the drawings without any creative work to those skilled in the art, which should be in the scope of this application. In the following description, the same reference numerals refer to the same members.

DESCRIPTION OF THE EMBODIMENTS

Figure 1:
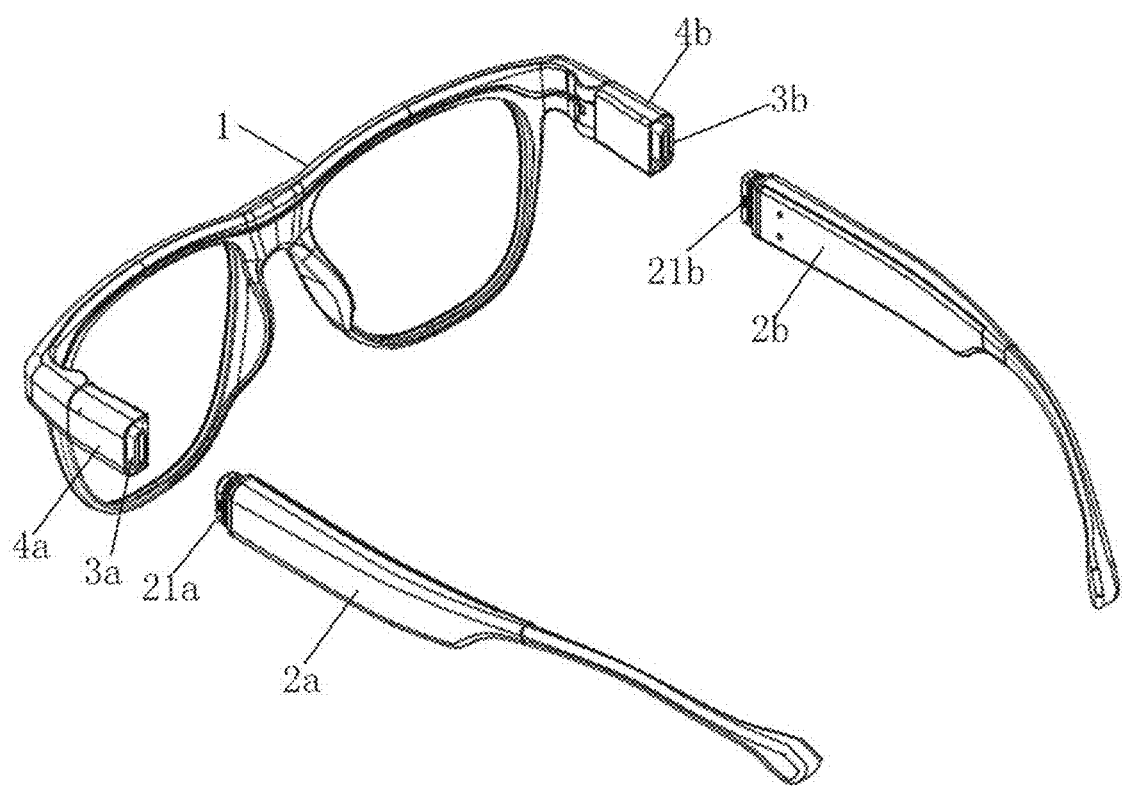
FIG. 1 is a schematic, exploded view of a pair of smart glasses provided by an embodiment of the present application.

For better illustrating the technical means, creative features, objects and effects of the present application, detailed description will be given for the embodiments provided by the present application with reference to the append drawings. Obviously, the described embodiments are only a part of the embodiments, and not all of the embodiments of the present application. Based on the embodiments of the present application, all other embodiments obtained by those skilled in the art without any creative work should be in the scope of this application.

It should be noted that when an element is referred to as being "fixed to" or "disposed in/at" another element, it may be directly or indirectly on the other element. When an element is referred to as being "connected to" another element, it may be directly or indirectly connected to the other element.

It should be understood that oriental or positional relationships indicated by terms "length", "width", "upper", "lower", "front", "rear", "left", "right", "vertical", "horizontal", "top", "bottom", "inner", "outer" and the like are only intended to facilitate the description of the present disclosure and simplify the description based on oriental or positional relationships shown in the accompanying drawings, not to indicate or imply that the apparatus or element referred must have a specific orientation, is constructed and operated in a specific orientation, and therefore cannot be understood as a limitation of the present disclosure.

In addition, terms "first" and "second" are only used for descriptive purposes, and cannot be understood as indicating or implying relative importance or implicitly indicating the number of technical features indicated. Therefore, features defined with "first" and "second" may explicitly or implicitly include one or more of these features. In the description of the present disclosure, "a plurality of" refers to two or more than two, unless otherwise particularly defined.

In this embodiment, a connecting assembly is provided for connecting a first component, a second component and a third component of a smart wearables, and connectors are provided on the second component and the third component. The connecting assembly includes a connecting wire, a first smart hinge and a second smart hinge. A first end of the first smart hinge is adapted to hinge with the first component, and a second end of the first smart hinge is adapted to connect the second component by plugging. A first end of the second smart hinge is adapted to hinge with the first component, and a second end of the second smart hinge is adapted to connect the third component by plugging. The second end of the first smart hinge is provided with a first connector, and the type of the first connector matches that of the connector on the second component. The second end of the second smart hinge is provided with a second connector, and the type of the second connector matches that of the connector on the third component. The first smart hinge and the second smart hinge are electrically connected through the connecting wire.

In this embodiment, an easy-disassemble smart wearables is also provided. The easy-disassemble smart wearables includes a first component, a second component, a third component, and the above-mentioned connecting assembly. The connecting wire of the connecting assembly is embedded in the first component, the first end of the first smart hinge is hinged with a first end of the first component, the second end of the first smart is connected to the second component by plugging, the first end of the second smart hinge is hinged with a second end of the first component, and the second end of the second smart hinge is connected to the third component by plugging.

Applying the connecting assembly of this embodiment to the smart wearables can realize detachable connection among the three components of the smart wearables. The connecting assembly includes two smart hinges, and the two smart hinges are electrically connected by the connecting wire. First ends of the two smart hinges are respectively hinged with two ends of the first component, and second ends of the two smart hinges are respectively connected to the second component and the third component by plugging. Since the connection of plugging is detachable, it is easy to disassemble the various components of the smart wearables, which is conducive to improving the production yield and reducing the maintenance time of the smart wearables. Further, the components of different generations or styles can be interchanged, the user can upgrade their smart wearables with the latest components, and thus product functions can be switched flexibly.

Figure 2:
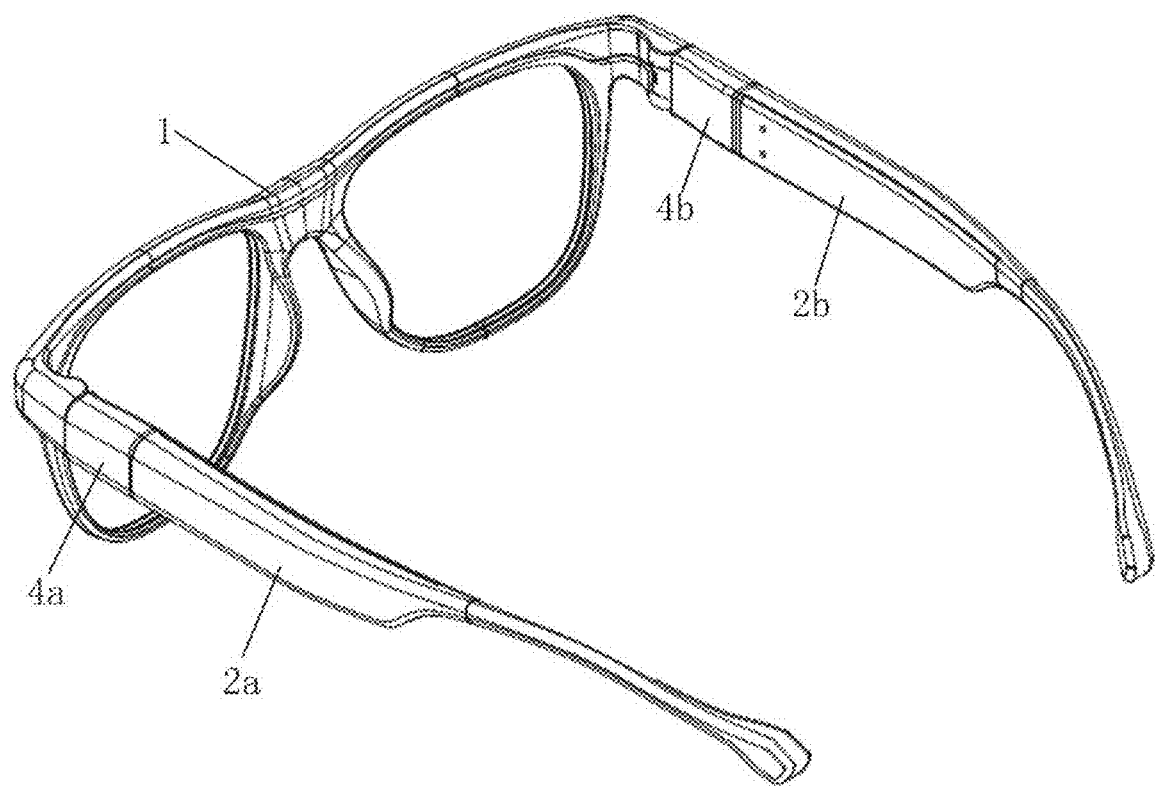
FIG. 2 is a schematic, assembled view of the smart glasses provided by an embodiment of the present application.
Figure 3:
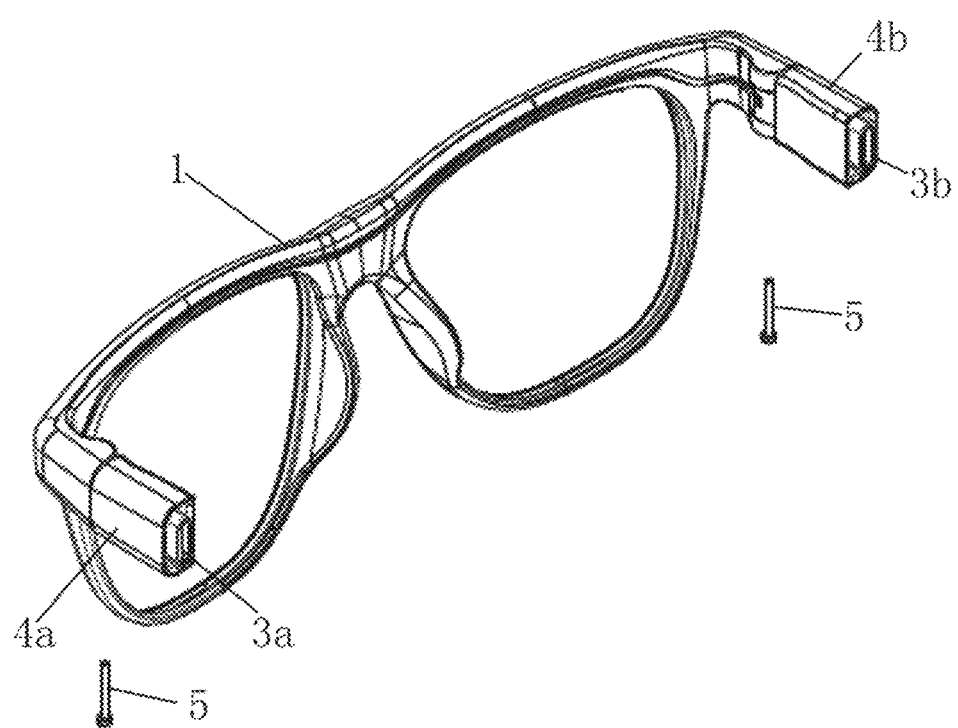
FIG. 3 is a schematic view of a connecting assembly provided by an embodiment of the present application, which is assembled to a frame of the smart glasses.

In order to facilitate the description of the technical solutions of this embodiment, the following describes the technical solutions of this embodiment in detail by taking smart glasses as an example:

Referring to FIG. 1 and FIG. 2, an embodiment of a pair of easy-disassemble smart glasses is shown. The smart glasses includes a first component, a second component, a third component and a connecting assembly. The first component is a frame 1 of the smart glasses, the second component is a left leg 2a of the smart glasses, and the third component is a right leg 2b of the smart glasses. The connecting assembly includes a connecting wire 3c, a first smart hinge 4a and a second smart hinge 4b. A connecting end of the left leg 2a is provided with a connector 21a, which matches a first connector 3a of the first smart hinge 4a. A connecting end of the right leg 2b is provided with a connector 21b, which matches a second connector 3b of the second smart hinge 4b. Referring to FIG. 3, first ends of the first smart hinge 4a and the second smart hinge 4b are respectively hinged to the first and second ends of the frame 1 through a mounting shaft (such as a screw 5). A second end of the first smart hinge 4a is connected to the connecting end of the left leg 2a by plugging, and is fixed to the connecting end of the left leg 2a by a snap structure. A second end of the second smart hinge 4b is connected to the connecting end of the right leg 2b by plugging, and is fixed to the connecting end of the right leg 2b by a snap structure.

Since the smart hinges are detachably connected to the legs by plugging, it is easy to disassemble the frame 1, the left leg 2a and the right leg 2b, which is conducive to improving the production yield and reducing the maintenance time of the smart wearables. Further, the frame 1 and the legs (i.e., the left leg 2a and the right leg 2b) of different generations or styles can be interchanged, the user can upgrade their smart wearables with the latest frame 1 and legs. For example, the legs may be replaced from the first generation to the second generation or third generation while the frame 1 is unchanged. The user may upgrade their smart glasses with the latest legs without using prescription lenses to replace the frame 1. The user also may replace different types of frames 1 while use the same legs. That is, the leg can be equipped with fashionable blue light frames 1 at work, or be equipped with sun frames 1 at sports or outdoors. The product functions can be switched flexibly.

Figure 4:
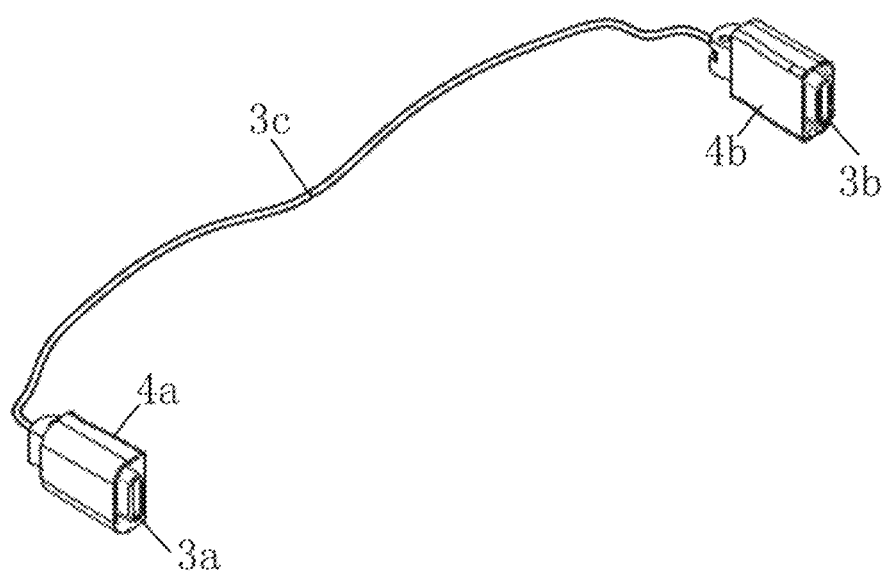
FIG. 4 is a schematic view of the connecting assembly provided by an embodiment of the present application.

It can be understood that the first connector 3a and the second connector 3b of the above-mentioned connecting assembly may be the same type or may be different in types. For example, as shown in FIG. 4, the first connector 3a and the second connector 3b both are USB Type-B connectors. Alternatively, the first connector 3a may be a USB Type-B connector, while the second connector 3b may be a USB Type-C connector, an apple lightning connector, or other types of connectors.

Figure 5:
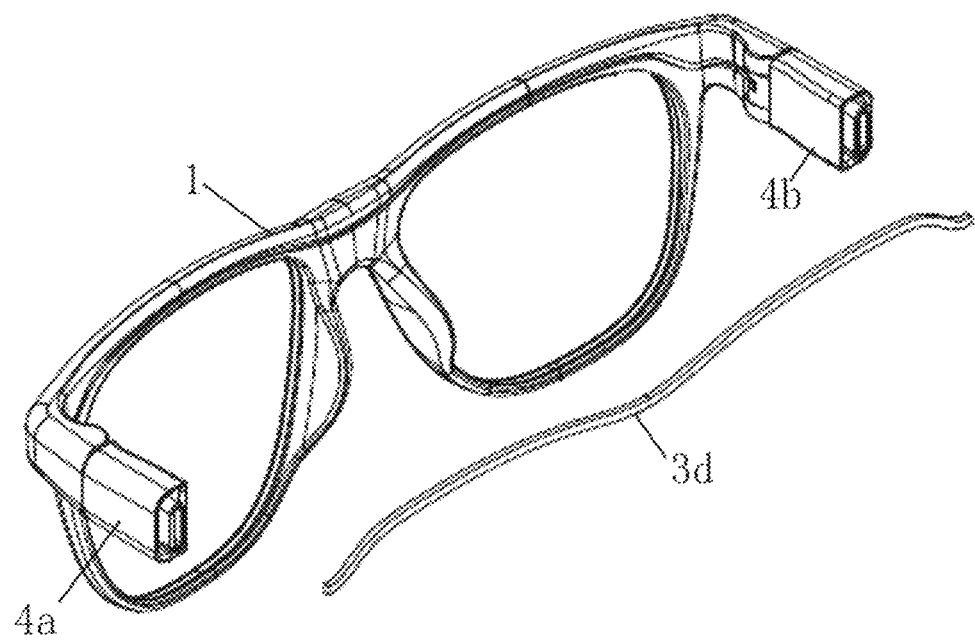
FIG. 5 is a schematic view of the frame provided by an embodiment of the present application, in which an open slot is defined.
Figure 6:
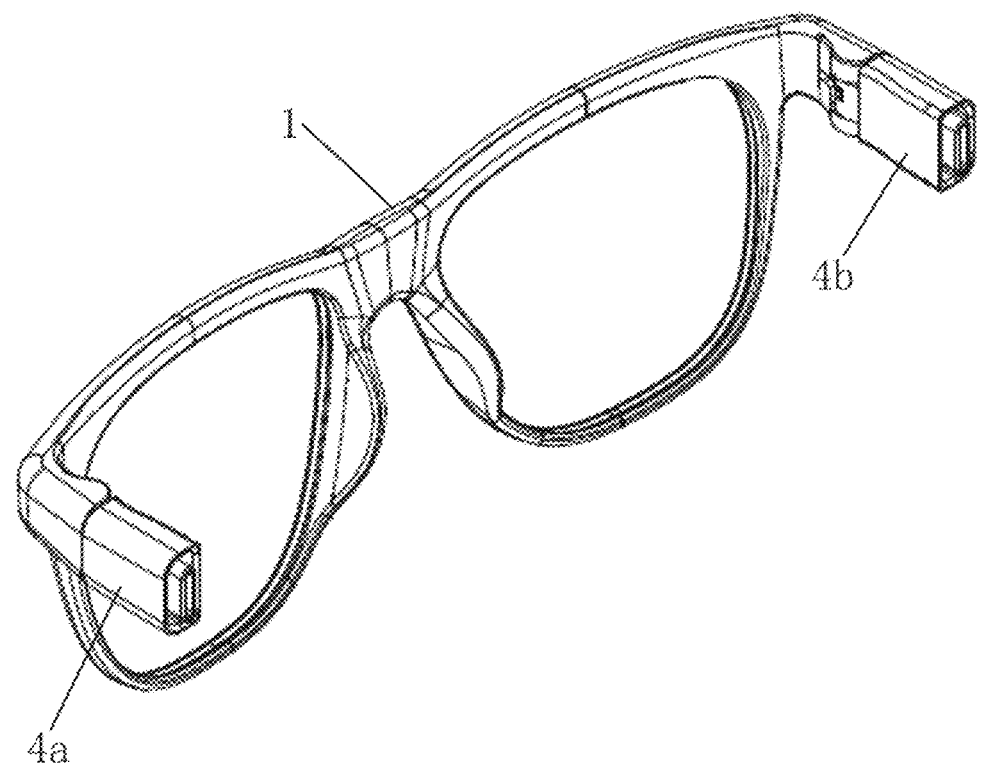
FIG. 6 is a schematic view of the frame provided by an embodiment of the present application, in which a connecting wire is embedded.

Referring to FIG. 5, the frame 1 of this embodiment is provided with an open slot 11, which extends through the left and right ends (i.e., the first and second ends) of the frame. The connecting wire 3c is embedded in the open slot 11. Each end of the open slot 11 is covered with a plastic sealing cover 3d, thus the connecting wire 3c is hidden in the frame 1 (as shown in FIG. 6).

Figure 7:
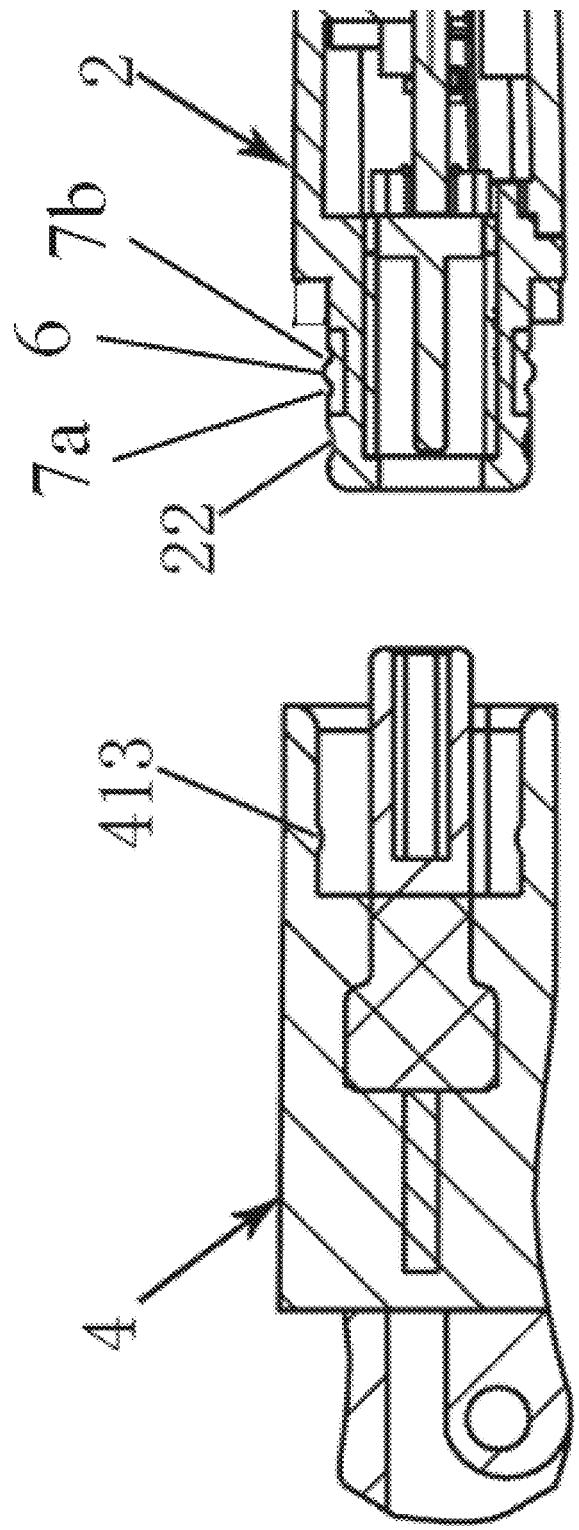
FIG. 7 is a schematic view of a smart hinge and a leg of the smart glasses with a sealing ring provided by an embodiment of the present application, which are before assembly.
Figure 8:
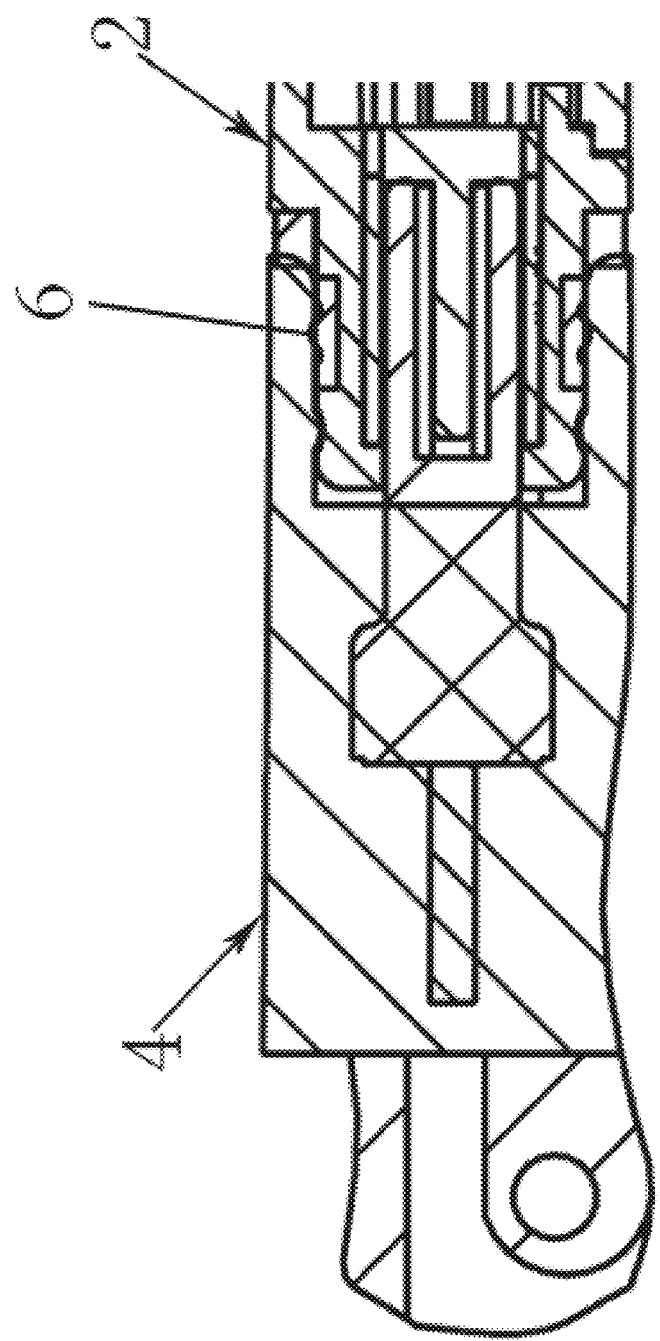
FIG. 8 is a schematic view of the smart hinge and the leg of the smart glasses with the sealing ring provided by an embodiment of the present application, which are assembled.

Referring to FIG. 7 and FIG. 8, in order to enhance the water-proof and dust-proof performance of the smart glasses, an outer surface of the connecting end of the leg 2 (including the left leg 2a and/or the right leg 2b) are enclosed by a sealing ring 6. When the smart hinge 4 (including the first smart hinge 4a and second smart hinge 4b) is inserted into the leg 2, a front end face of the second end of the smart hinge 4 abuts against the sealing ring 6. Further, both sides of the outer surface of the connecting end of the leg 2 are provided with an anticollision groove 7a, 7b near the sealing ring 6. When the leg 2 is connected to the smart hinge 4, the sealing ring 6 is pressed to deform and engages into the anticollision grooves 7a, 7b, thereby preventing the sealing ring 6 from squeezing the leg 2.

Figure 9:
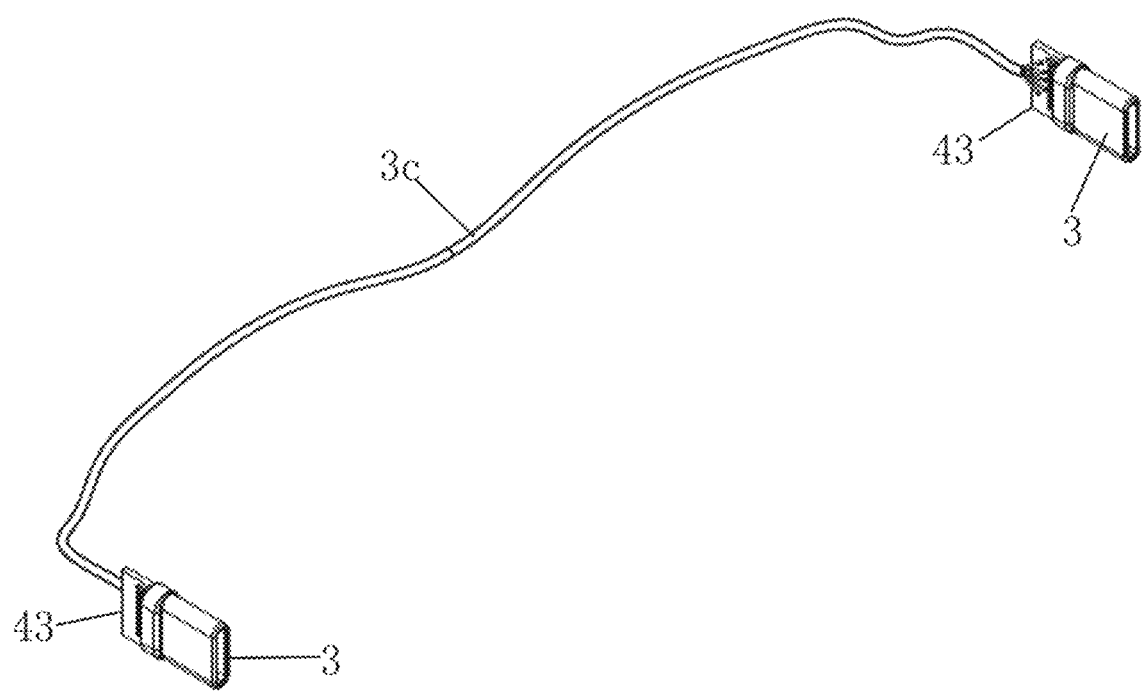
FIG. 9 is a schematic view of the connecting wire, a circuit board and substrate provided by an embodiment of the present application, wherein the connecting wire and the circuit board are welded to the substrate.
Figure 10:
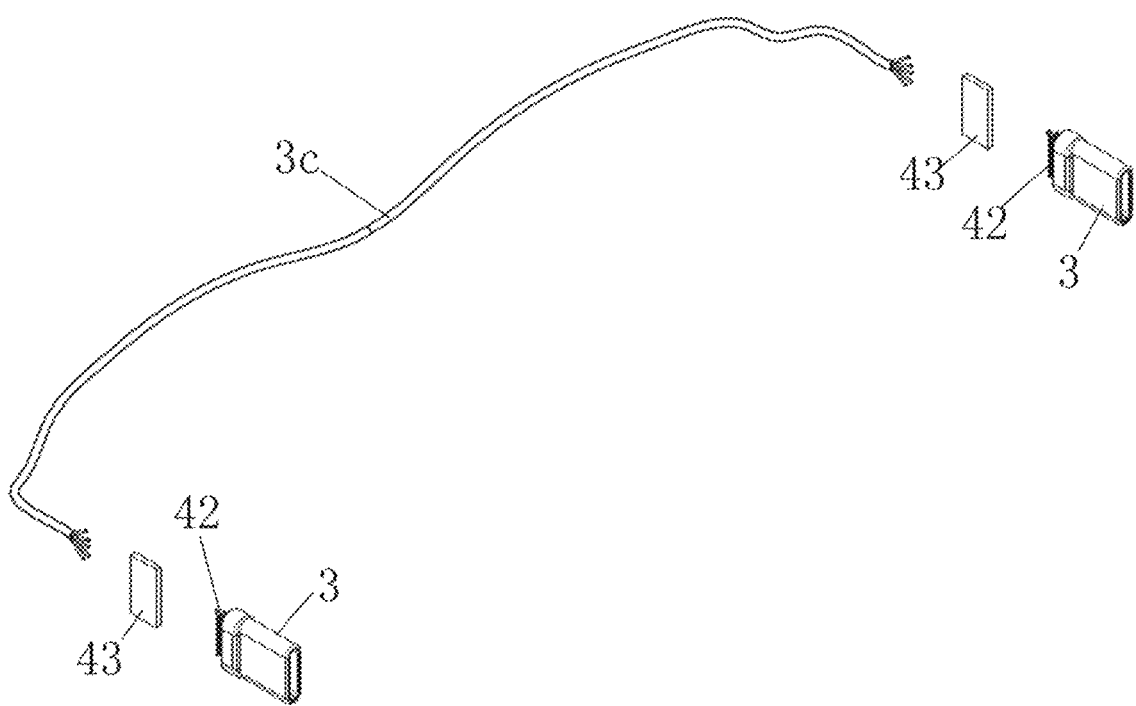
FIG. 10 is a schematic view of the connecting wire, the circuit board and the substrate provided by an embodiment of the present application, which are before assembly.
Figure 11:
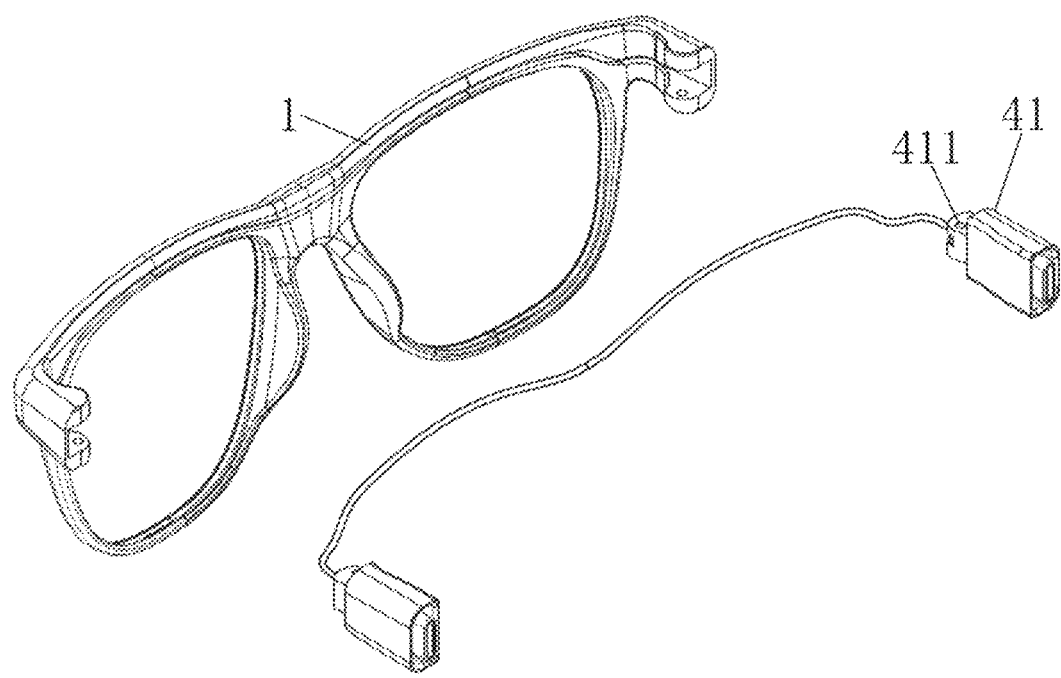
FIG. 11 is a schematic view of the smart hinge and the frame of the smart glasses provided by an embodiment of the present application, which are before assembly.

Referring to FIG. 9 to FIG. 11, the smart hinge 4 further includes an insulating shell 41, a circuit board 42 and a substrate 43. A connecting hole 411 is defined in a first end of the insulating shell 41, and the first end of the insulating shell 41 is hinged to the frame 1 by a screw 5 mounted into the connecting hole 411. The connector 3 (including the first connector and/or the right connector 3b) is mounted at a second end of the insulating shell 41, the circuit board 42 is installed in the insulating shell 41, and the connector 3 is electrically connected to the circuit board 42. The first end of the insulating shell 41 is adapted to hinge with the frame 1, and the second end of the insulating shell 41 is adapted to hinge with the leg 2. The second end of the insulating shell 41 is provided with a latching portion 413, which is used to connect the leg 2 by snap-fit. An end of the connecting wire 3c is welded to the substrate 43, and the circuit board 42 is welded to the substrate 43 too.

As shown in FIG. 7, in this embodiment, the second end of the insulating shell 41 defines a chamber therein, and the latching portion 413 may be an internal latching element which protrudes outwardly from an inner wall of the chamber into the chamber.

Further, the insulating shell 41 includes a plastic shell body and a cover. The circuit board 42 is located in a mounting groove defined in the shell body, and the cover covers the mounting groove. A gap between the circuit board 42 and the mounting groove is filled with water-proof glue, so that water can be prevented from entering the leg from the smart hinge.

When the smart hinge and the leg are connected by plugging, a snap structure is also provided therebetween for reinforcement. Due to the different types of connectors provided on the leg, the shapes of interfaces for inserting of the smart hinge are also different. The latching portion 413 in the insulating shell 41 can be made in different forms according to specific requirements.

An MCU is set inside the leg, and wireless communication modules are set inside the legs and the smart hinges, respectively. The wireless communication module inside the smart hinge communicates with the MCU or a mobile phone, and the MCU communicates with the mobile phone through the wireless communication module in the leg.

In one embodiment, the connectors at the connecting ends of the left leg 2a and the right leg 2b are USB type-B connectors, USB type-C connectors, or apple lightning connectors. The connecting wire 3c is an electric cable, the electric cable is embedded in the frame 1, and the first connector 3a at the left end of the frame 1 and the second connector 3b at the right end of the frame 1 are connected together by the electric cable.

Figure 12:
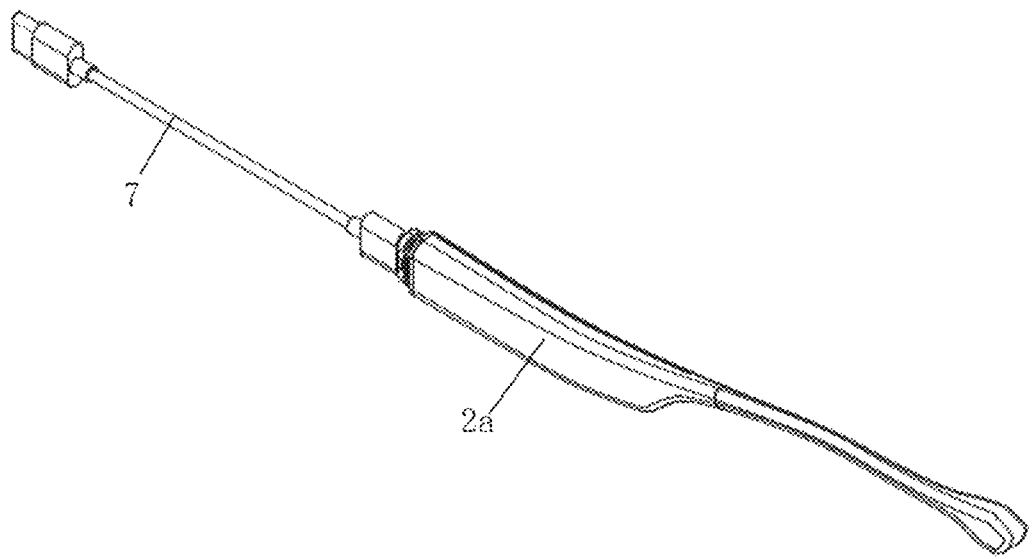
FIG. 12 is a schematic view of the leg of the smart glasses provided by an embodiment of the present application, which is connected to a corresponding type of external charging cable for charging a rechargeable battery inside the leg.

Both the left leg 2a and the right leg 2b are provided with rechargeable batteries that are electrically connected to the connectors at their connecting ends. Referring to FIG. 12, when the rechargeable batteries need to be charged, the left leg 2a and/or the right leg 2b can be disassembled from the connecting assembly and then the connector of the left leg 2a and/or the right leg 2b can be connected to a corresponding type of external charging cable, thereby realizing charging the rechargeable batteries.

The above merely provides the preferred embodiments of the present disclosure, which is illustrative, rather than restrictive, to the present disclosure. However, it should be understood by those skilled in the art that, many variations, modifications even substitutions that do not depart from the spirit and scope defined by the present disclosure, shall fall into the extent of protection of the present disclosure.

What is claimed is:

1. A connecting assembly configured for connecting a first component, a second component and a third component of an easy-disassemble smart wearables, comprising a connecting wire, a first smart hinge and a second smart hinge,
    a first end of the first smart hinge being configured to hinge with the first component, and a second end of the first smart hinge being configured to be detachably connected to the second component by plugging;
    a first end of the second smart hinge being configured to hinge with the first component, and a second end of the second smart hinge being configured to be detachably connected to the third component by plugging;
    the second end of the first smart hinge being provided with a first connector, wherein the first connector is electrically and mechanically connected to a connector provided at one end of the second component when the second component is attached to the first smart hinge, and another end of the second component is configured to be worn on a first part of a human body during use;
    the second end of the second smart hinge being provided with a second connector, wherein the second connector is electrically and mechanically connected to a connector provided at one end of the third component when the third component is attached to the second smart hinge, and, another end of the third component is configured to be worn on a second part of a human body during use; and
    the first connector of the first smart hinge being electrically connected to the second connector of the second smart hinge through the connecting wire.

2. The connecting assembly of claim 1, wherein the first smart hinge or the second smart hinge further comprises an insulating shell and a circuit board, the circuit board is mounted in the insulating shell, the first connector or the second connector is electrically connected to the circuit board, a first end of the insulating shell is configured to hinge with the first component, the first connector or the second connector is provided at a second end of the insulating shell, and the second end of the insulating shell is provided with a latching portion for connecting the second component or the third component by snap-fit.

3. The connecting assembly of claim 2, wherein the first smart hinge or the second smart hinge further comprises a substrate, an end of the connecting wire is welded to the substrate, and the circuit board of the first smart hinge or the second smart hinge is welded to the substrate.

4. The connecting assembly of claim 2, wherein a connecting hole is defined in the first end of the insulating shell, and the first end of the insulating shell is hinged with the first component by a shaft mounted in the connecting hole.

5. The connecting assembly of claim 2, wherein the first connector or the second connector is welded to the circuit board, and the first connector or the second connector is a USB Type-B connector, a USB Type-C connector or an apple lightning connector.

6. The connecting assembly of claim 2, wherein the first/second connector is surrounded by and spaced from a second end of the insulating shell, and a chamber is defined between an inner circumferential wall of the second end of the insulating shell and an outer circumferential wall of the first/second connector for inserting of the connector of the second/third component therein, the latching portion is an internal latching element which protrudes outwardly from the inner circumferential wall of the second end of the insulating shell into the chamber.

7. An easy-disassemble smart wearables, comprising a first component, a second component, a third component and a connecting assembly, the connecting assembly comprising a connecting wire, a first smart hinge and a second smart hinge, the first smart hinge being electrically connected to the second smart hinge through the connecting wire;

the connecting wire of the connecting assembly being received in the first component;

a first end of the first smart hinge being hinged with a left end of the first component, and a second end of the first smart hinge being connected to the second component by plugging of a connecting end of the second component into the second end of the first smart hinge, the second end of the first smart hinge being provided with a first connector; and a first end of the second smart hinge being hinged with a right end of the first component, and a second end of the second smart hinge being connected to the third component by plugging of a connecting end of the third component into the second end of the second smart hinge, the second end of the second smart hinge being provided with a second connector;

wherein a protruding ring and two anticollision grooves are provided on an outer circumferential wall of the connecting end of the second/third component, and the two anticollision grooves are arranged at two opposite sides of the protruding ring, respectively; and wherein the protruding ring is pressed by an inner circumferential wall of the second end of the first/second smart hinge to deform and engages into the anticollision grooves when the connecting end of the second/third component is plugged into the second end of the first/second smart hinge.

8. The easy-disassemble smart wearables of claim 7, wherein an open slot is defined in the first component and extends through the left and right ends of the first component, the connecting wire is received in the open slot, and an open end of the open slot is covered with a sealing cover.

9. The easy-disassemble smart wearables of claim 7, wherein the easy-disassemble smart wearables is a pair of smart glasses, the first component is a frame of the smart glasses, the second component is a left leg of the smart glasses, and the third component is a right leg of the smart glasses;

the connecting end of the left leg is provided with a connector which is electrically and mechanically connected to the first connector when the left leg is assembled to the frame, and the connecting end of the right leg is provided with a connector which is electrically and mechanically connected to the second connector when the right leg is assembled to the frame;

the first ends of the first smart hinge and the second smart hinge are respectively hinged with the left and right ends of the frame through a mounting shaft, the second end of the first smart hinge is fixed to the connecting end of the left leg by a snap structure, and the second end of the second smart hinge is fixed to the connecting end of the right leg by a snap structure.

10. The easy-disassemble smart wearables of claim 9, wherein the connector at the connecting end of the left leg or the right leg is a USB Type-B connector, a USB Type-C connector or an apple lightning connector.

11. The easy-disassemble smart wearables of claim 9, wherein the connecting wire is an electric cable which is received in the frame, the first connector at the left end of the frame and the second connector at the right end of the frame are connected together by the electric cable.

12. The easy-disassemble smart wearables of claim 9, wherein the left leg and/or the right leg are provided with a rechargeable battery that is electrically connected to the connector at the connecting end thereof; when the rechargeable battery needs to be charged, the left leg and/or the right leg can be disassembled from the connecting assembly and then the connector of the left leg and/or the right leg can be connected to a corresponding type of external charging cable, thereby realizing charging the rechargeable battery.

13. A pair of smart glasses, comprising:

a front frame;

a connecting assembly comprising a connecting wire received in the front frame and first and second smart hinges being provided at left and right ends of the connecting wire, respectively, wherein the first smart hinge comprises a first end being rotatably connected to a left end of the front frame and a second end being provided with a first connector, and the second smart hinge comprises a first end being rotatably connected to a right end of the front frame and a second end being provided with a second connector;

a left leg being connected to the front frame by the first smart hinge, a third connector being provided at an end of the left leg and connected to the first connector of the first smart hinge mechanically and electrically by plugging; and a right leg being connected to the front frame by the second smart hinge, a fourth connector being provided at an end of the right leg and connected to the second connector of the second smart hinge mechanically and electrically by plugging.

14. The smart glasses of claim 13, wherein the first/second smart hinge further comprises a shell, a first end of the shell is rotatably connected to the left/right end of the front frame, a portion of the first/second connector is integrally fixed inside a middle portion of the shell, and a second end of the shell surrounds and spaces from a remaining portion of the first/second connector, a chamber is defined between the remaining portion of the first/second connector and the second end of the shell for inserting of the third/fourth connector therein.

15. The smart glasses of claim 14, wherein a latching protrusion protrudes from an inner circumferential wall of the second end of the shell towards the chamber, a concave is defined in an outer circumferential wall of the third/fourth connector, and the latching protrusion engages into the concave when the third/fourth connector is inserted into the chamber of the first/second smart hinge.

16. The smart glasses of claim 14, wherein a deformable protruding ring is formed on an outer circumferential wall of the third/fourth connector, and an anticollision groove is defined on the circumferential outer wall of the third/fourth connector and adjacent to the deformable protruding ring; and wherein the deformable protruding ring deforms and engages into the anticollision groove when the third/fourth connector is inserted into the chamber of the first/second smart hinge.

17. The smart glasses of claim 16, wherein two anticollision grooves are defined on the outer circumferential wall of the third/fourth connector and located at two opposite sides of the deformable protruding ring, respectively.

18. The smart glasses of claim 16, wherein a sealing member is formed around the third/fourth connector and at least partly embedded into a shell of the third/fourth connector, and the deformable protruding ring and the anticollision groove are provided on an outer circumferential wall of the sealing member.

* * * * *